March 4, 1941. J. L. MILLER 2,233,939
ELECTRICAL SURGE ABSORBER
Filed Oct. 27, 1938 4 Sheets-Sheet 1
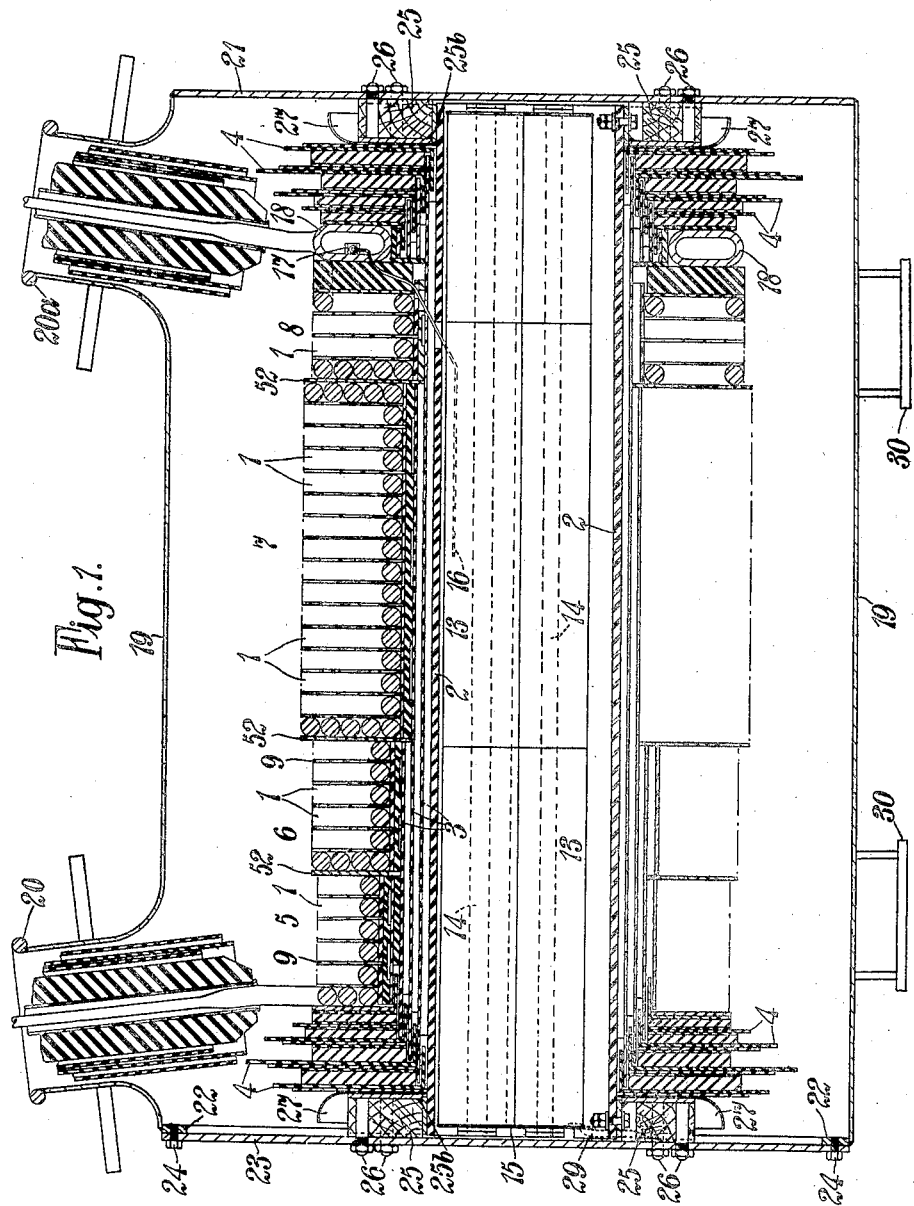
J. L. Miller
Inventor
By: Glascock Downing &Seebold
Attys.

March 4, 1941.　　　　J. L. MILLER　　　　2,233,939
ELECTRICAL SURGE ABSORBER
Filed Oct. 27, 1938　　　　4 Sheets-Sheet 2

J. L. Miller
Inventor

By Glascock Downing & Seebold
Attys.

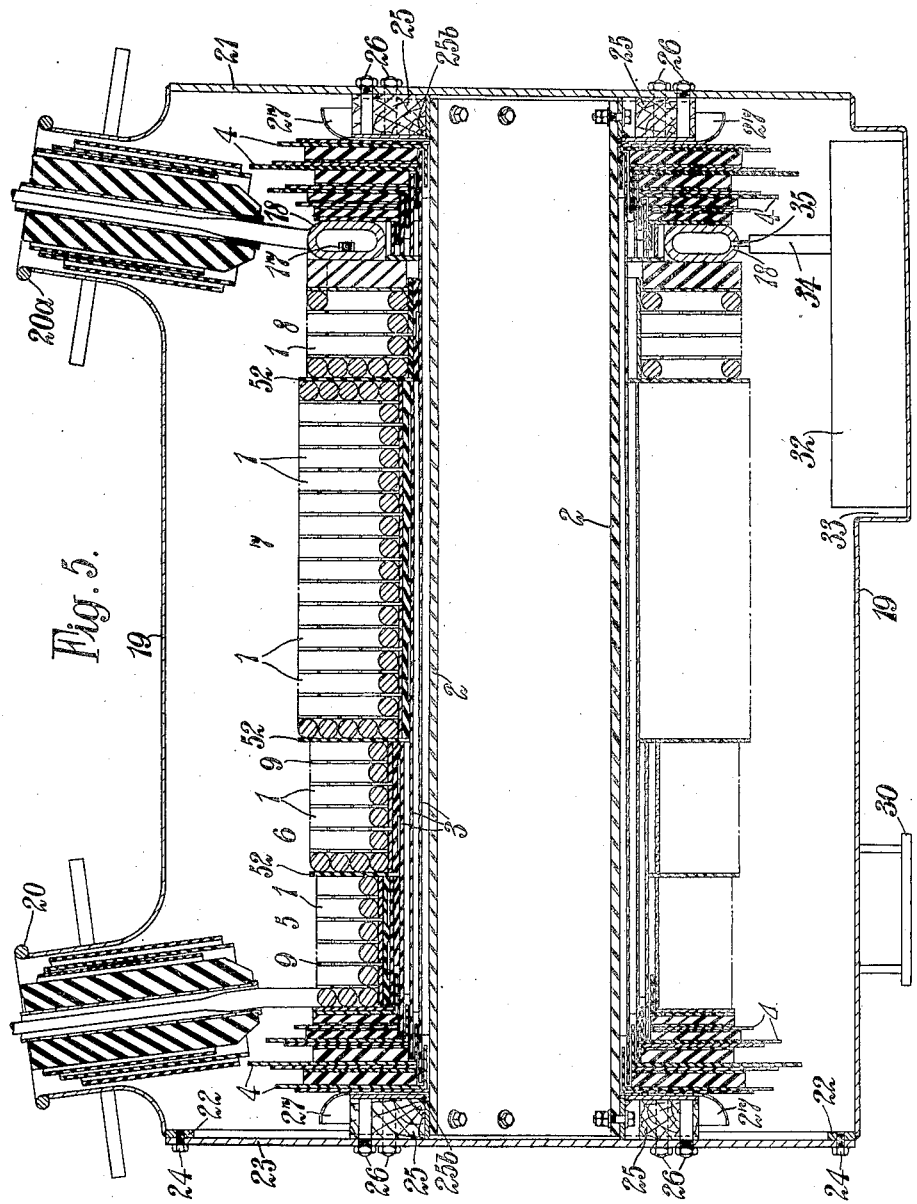

Patented Mar. 4, 1941

2,233,939

UNITED STATES PATENT OFFICE 2,233,939

ELECTRICAL SURGE ABSORBER

John Leonard Miller, Hollinwood, England, assignor to Ferranti Electric Inc., New York, N. Y.

Application October 27, 1938, Serial No. 237,361
In Great Britain October 29, 1937

4 Claims. (Cl. 175—356)

This invention relates to electrical surge absorbers used for the protection of inductive apparatus such as transformers, generators or motors from surges having steep fronts or backs, due for instance to lightning. More specifically the invention relates to that type of surge absorber used for the above purpose in which an inductance is connected in series with an overhead line or cable in which surges originate, the inductance having capacitance to earth between it and the apparatus, either in concentrated or distributed form, and in which oscillations due to interaction between the inductance and the connected earth capacity and the effective earth capacity of the protected inductive apparatus are damped by a secondary resistive circuit of chosen constants inductively coupled to the inductance.

In a known surge absorber of the above type, the secondary resistive circuit is formed by a metal cylinder in which the inductance is enclosed; when used in very high voltage surge absorbers, this arrangement suffers from the drawback that as the coupling between the secondary resistive circuit and the inductance is poor there is therefore a risk that the amplitude of the potential of a surge would be considerably greater at the apparatus than it would be if no absorber were used.

The present invention has for its main object the substantial elimination of the above drawback and the provision of satisfactory damping means.

The invention in brief consists in a surge absorber comprising a primary winding having low self-capacity, a secondary circuit in close coupled relationship to said primary winding composed of a plurality of sets of endless rings of resistance material, a pair of discs of insulating material disposed one on each side of each set of rings, a plurality of laterally projecting tongue portions on one of each pair of said discs disposed in concentric circles to form lodgments locating said rings of resistance material of each set in concentric relationship.

Referring to the accompanying diagrammatic drawings:

Figure 1 is a sectional view of a surge absorber according to one embodiment of the invention.

Figure 5 is a sectional view of another embodiment of the invention.

Figure 2:
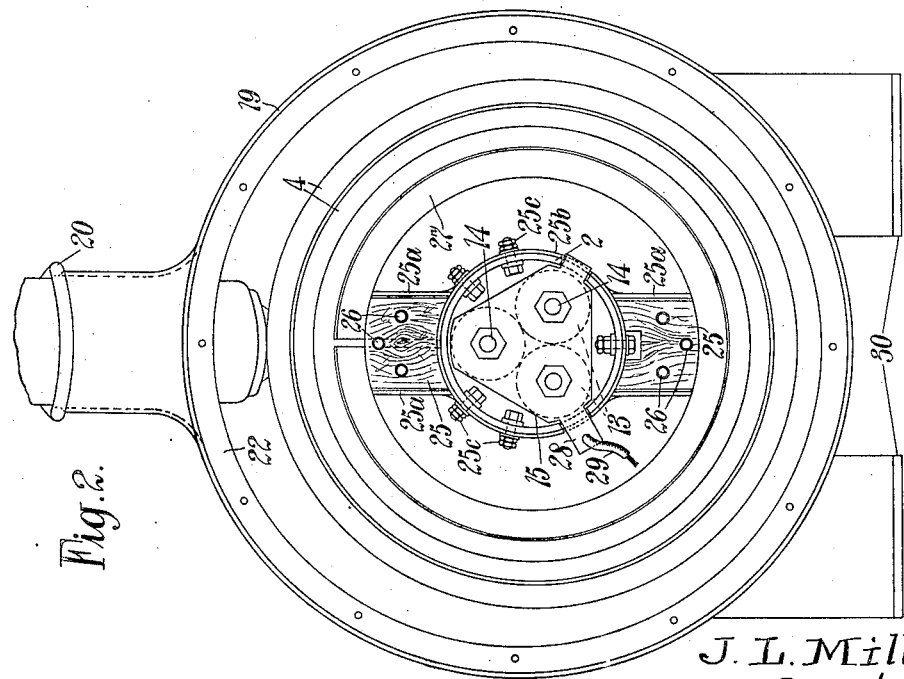
Figure 2 is an end view of the embodiment shown in Figure 1 with the end 23 removed.
Figure 3:
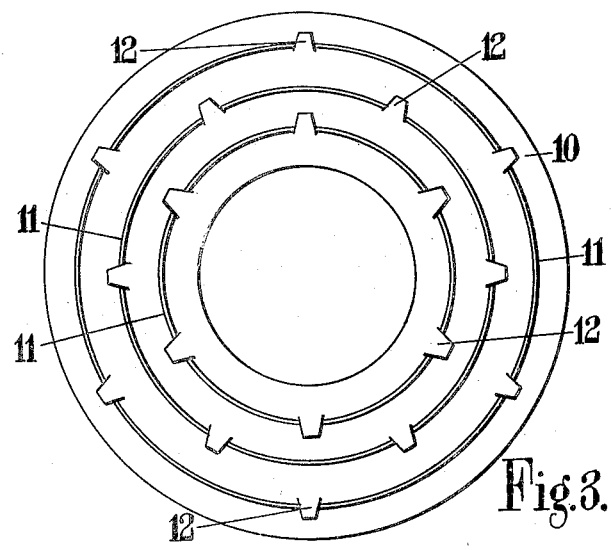
Figure 3 is an end view of one of the resistance elements 9 without insulation.

In carrying the invention into effect according to one form by way of example illustrated in Figures 1 to 3 as applied to an electrical surge absorber for potentials of the order of 30 kv. upwards, an inductance formed from thirty-two disc-type coils 1 is disposed co-axially on a former 2 of insulating material. Several layers 3 of insulation are provided between the former and the inner turns of the coils. Near to each end of the former 2 these layers meet collars 4 of insulating material which serve also to keep the end coils in position. The coils are wound in four groups, each coil in the first group 5 having three turns, in the second group 6 four turns, in the third group 7 five turns and in the last group 8 five turns, the group 8 having a smaller diameter than group 7, although the coils therein have the same number of turns. The groups near the ends of the former are of reduced diameter in order to give ample clearance between them and portions of the earthed case in which they are to be mounted. All the coils are wound in the same direction and mutually in series and the turns of all coils are insulated from one another.

Between each pair of adjacent coils in each of the sections 5 and 6 resistance elements 9 are inserted. Each of these elements comprises an annular ring 10 (Figure 3) of paper having three rings 11 of resistance wire of differing radii attached concentrically thereto by means of tongues 12 cut in the paper. A further paper annulus is attached to each face of the first annulus, thus completely insulating the rings of resistance wire from one another. The whole element 9 also insulates from one another the coils between which it is disposed. Between each pair of adjacent coils in each of sections 7 and 8 similar resistance elements are provided but these elements each include four rings 11 of resistance wire. Between the several groups of coils insulation 52 only is provided.

Three condenser type bushings 13 are inserted inside the former 2, as shown in Figure 2, the inner conductors 14 of the bushings being connected to a fixing plate 15 at one end of the former whilst the outer conductors of the bushings, of which one is shown in part at 16, are connected to a terminal 17 electrically connected to the inside of a metal tube 18.

This tube, which nearly encircles the former, acts as a protective cover for the terminal against corona effects.

The coil assembly is mounted within a protective metal case 19 fitted with two standard high tension type insulated terminal bases 20, 20a; one end 21 of the case is formed integrally with the body portion thereof the other end of which is fitted with a flange 22 to which an end plate 23 is attached by studs 24 as shown in Figure 1.

Two pairs of locating blocks 25 are attached to the ends 21, 23 of the case, being fixed thereto by means of studs 26 which are passed through holes in the ends 21, 23 of the case. Locating rings 25b formed as flanged collars are attached to each end of the former 2 by means of bolts 25c which pass through the collar portion of each ring. The flange portions bear against the blocks 25 and prevent longitudinal movement of the former. Plates 25a are welded to the locating rings and when assembled these plates are disposed on each side of each block 25 thus preventing rotational movement of the former.

Corona shields 27 are provided between the end insulating collars 4 and the locating rings. One end of the inductance passes through the insulated terminal base 20 and the other end of the inductance passes through the terminal base 20a. A lead from the terminal 17 also passes through the terminal base 20a thus joining the condensers to one end of the inductance. The bushing fixing plate 15 is provided with a tag 28 to which one end of a flexible lead 29 is connected, the other end of which is connected to the end plate 23. Feet 30 are provided upon which the completed surge absorber stands. The case is oil filled, the oil circulating freely between successive layers of insulation and between the condenser type bushings. Terminals (not shown) are mounted on the terminal bases 20, 20a.

Figure 4:
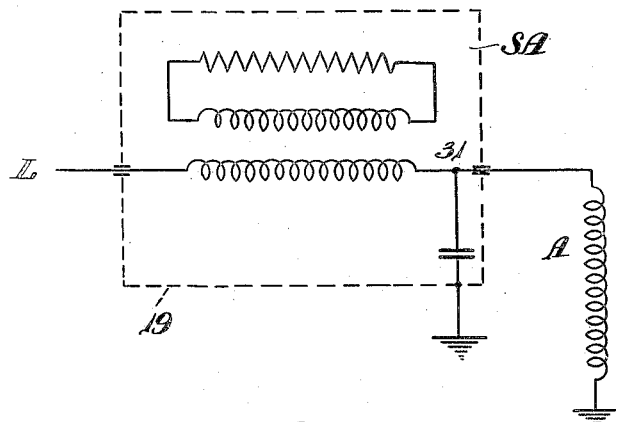
Figure 4 is an equivalent circuit diagram of a surge absorber in accordance with the invention connected to apparatus to be protected.

The electrical surge absorber SA is connected as shown in the equivalent circuit diagram of Figure 4 between the transmission line L and the inductive apparatus A to be protected, the end 31 of the absorber inductance which is connected internally to the condenser bushings being joined to the apparatus. The metal case 19 is earthed.

Figure 6:
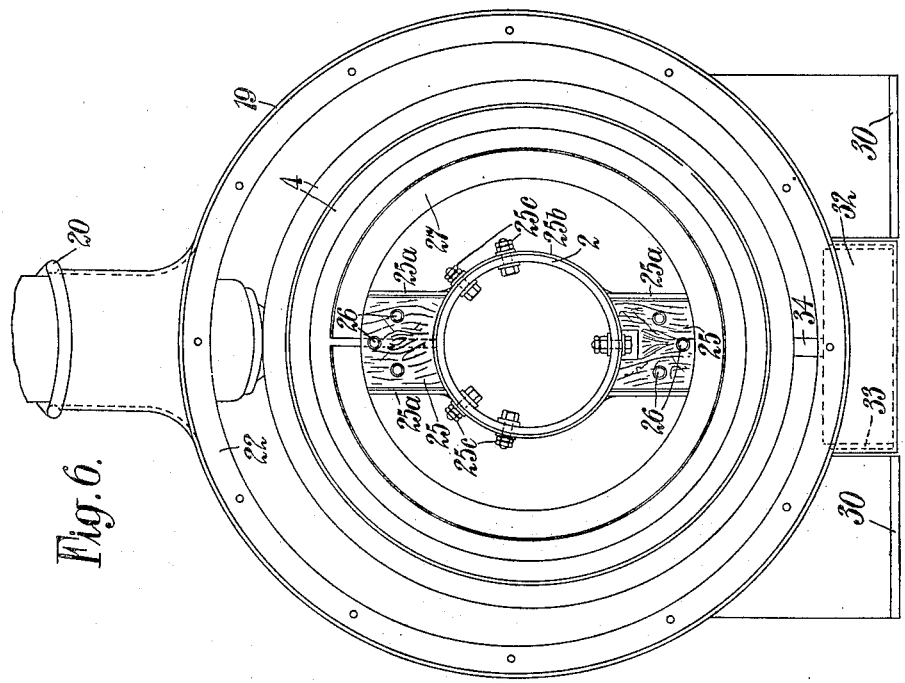
Figure 6 is an end view of the embodiment shown in Figure 5 with end 23 removed.

In a modification shown in Figures 5 and 6 the concentrated capacity of the condenser type bushings 13 is replaced by that of a condenser of other known form shown diagrammatically at 32 which is housed in a recess 33 at the bottom of the case 19. The cover of the condenser forms one electrode thereof and is connected to the case 19 and a lead 34 from the other electrode projects through the top of the condenser and passes through a hole 35 in the metal tube 18 to make connection with the terminal 17.

In either of the above forms any number and arrangement of coils may be employed and the coils may be of forms other than of disc-type provided that they have a low value of self-capacity. Instead of rings of wire in the resistance elements annuli formed from ribbon of resistance material may be employed and the rings or annuli may be circular as already described or of any other desired shape, for instance square or elliptical. The maximum diameters of the resistance elements may if desired be greater than that of the coils but care must be taken that sufficiently close coupling exists between the inductance and the secondary resistive circuit.

The number of resistance elements is chosen in accordance with the requirements of the particular circuit with which the surge absorber is to be used, this number being computed from known constants of the circuit and of the surge absorber.

It has been found that surge absorbers in accordance with the invention produce a flattening of both steep wave fronts and steep wave backs, whilst the secondary winding and the concentrated capacity at the output end of the inductance damp oscillations to such an extent as to prevent them from rising to dangerous amplitudes.

What I claim is:

1. A surge absorber comprising a primary winding having low self-capacity, a secondary circuit in close coupled relationship to said primary winding composed of a plurality of sets of endless rings of resistance material, a pair of discs of insulating material disposed one on each side of each set of rings, a plurality of laterally projecting tongue portions on one of each pair of said discs disposed in concentric circles to form lodgments locating said rings of resistance material of each set in concentric relationship.

2. A surge absorber as claimed in claim 1 wherein said endless rings of resistance material are circular in form.

3. A surge absorber as claimed in claim 1 wherein said rings of resistance material are circular in cross-section.

4. A surge absorber as claimed in claim 1 wherein said rings of resistance material are of ribbon form.

JOHN LEONARD MILLER.